May 16, 1967

W. H. SLAVIK 3,320,469

VERTICAL DYNAMIC PINCUSHION CORRECTION CIRCUITS FOR TELEVISION RECEIVERS

Original Filed Nov. 12, 1963

INVENTOR.

William H. Slavik

BY

Mueller & Aichele

Attys.

United States Patent Office 3,320,469

Patented May 16, 1967

3,320,469

VERTICAL DYNAMIC PINCUSHION CORRECTION CIRCUITS FOR TELEVISION RECEIVERS

William H. Slavik, Chicago, Ill., assignor to Motorola, Inc., Chicago, Ill., a corporation of Illinois Continuation of application Ser. No. 322,859, Nov. 12, 1963. This application Sept. 13, 1966, Ser. No. 579,173

12 Claims. (Cl. 315—24)

This application is a continuation of Ser. No. 322,859, filed Nov. 12, 1963.

This invention relates generally to deflection systems for color television receivers and more particularly to circuit improvements for providing dynamic correction of pincushion distortion of the top and bottom of the raster on the viewing screen of the cathode ray tube.

The use of wide deflection angle cathode ray tubes, particularly those having a relatively flat rectangular viewing screen, results in a distortion of the raster of the type known as pincushion distortion. Such distortion is usually corrected in black and white receivers by modifying the deflection yokes to provide a non-symmetrical sweep when substantially linear sawtooth waves are applied thereto. However, with the relatively complicated deflection systems of tri-gun cathode ray tubes of the type used in color television receivers, it is desirable to avoid introducing any non-symmetrical convergence errors, and essentially linear field yokes are preferable. This requires that pincushion distortion be corrected by modifying the waves genertaed in the deflection systems rather than by modifications of the yoke structure.

One manner of correcting for pincushion distortion on the top and bottom of the raster is to modify the vertical deflection wave with an esentially parabolic wave occurring at horizontal deflection frequency. For example, sinusoidal oscillations which approximate a parabolic wave may be superimposed on the vertical sawtooth sweep to provide straightening at the top and the bottom of the raster. However, it is necessary that the amplitude of such sinusoidal oscillations vary with vertical scan, being a maximum at the top and the bottom of the raster and a minimum at the center of the raster. In addition, for oscillations of a given phase correction is obtained at either the top or the bottom of the raster only, and the distortion is increased at the opposite side of the raster by a corresponding amount. Thus in such arrangements it is necessary, in addition to modifying the amplitude of the sinusoidal oscillations superimposed on the vertical sawtooth sweep, to reverse the phase of the sinusoidal oscillations at the center of vertical scan so that the distortion correction thereby obtained is symmetrical.

It is desirable in providing vertical dynamic pincushion correction in the above manner and with a practical circuit acceptable for use in commercial color television receivers to minimize the number of additional circuit components required so as not to increase the expense and complexity of the receiver chassis. For reliable, longlife operation the resulting correction circuit arrangement should be simple to adjust and should require low input power to keep heat dissipation at a minimum. The modifying wave superimposed on the vertical sawtooth sweep should be derived from the horizontal deflection and high voltage system of the receiver in such a manner so as not to impair horizontal deflection efficiency, and without requiring substantial modifications of the horizontal deflection and high voltage system.

It is therefore an object of the invention to provide an improved vertical dynamic pincushion correction circuit arrangement particularly useful in color television receivers.

Another object is to provide an improved circuit wherein pincushion distortion is corrected on the top and bottom of the raster of a cathode ray tube by dynamic modification of the vertical deflection wave rather than by changes in the deflection yokes so that a linear field yoke may be used with wide deflection angle tri-gun color cathode ray tube.

A further object is to provide a vertical dynamic pincushion correction circuit which is simple in construction, requiring a minimum number of circuit components, and which is easy to adjust and reliable in operation.

Still another object of the invention is to provide a vertical dynamic pincushion correction circuit for tri-color cathode ray tubes which does not impair the efficiency of the horizontal deflection and high voltage system of the receiver, and which requires low power input to maintain heat generated in the receiver.

A still further object of the invention is to provide a simple, economical circuit to dynamically correct for pincushion distortion on the top and bottom of the raster of a color cathode ray tube by instantaneously varying vertical sweep waveforms by controlled sinusoidal oscillations occurring at horizontal deflection frequency to improve linearity at the top and bottom of the raster.

Other objects as well as the features and advantages of the invention will become apparent from the following description when taken in conjunction with the accompanying drawings, in which.

Figures 1, 2:
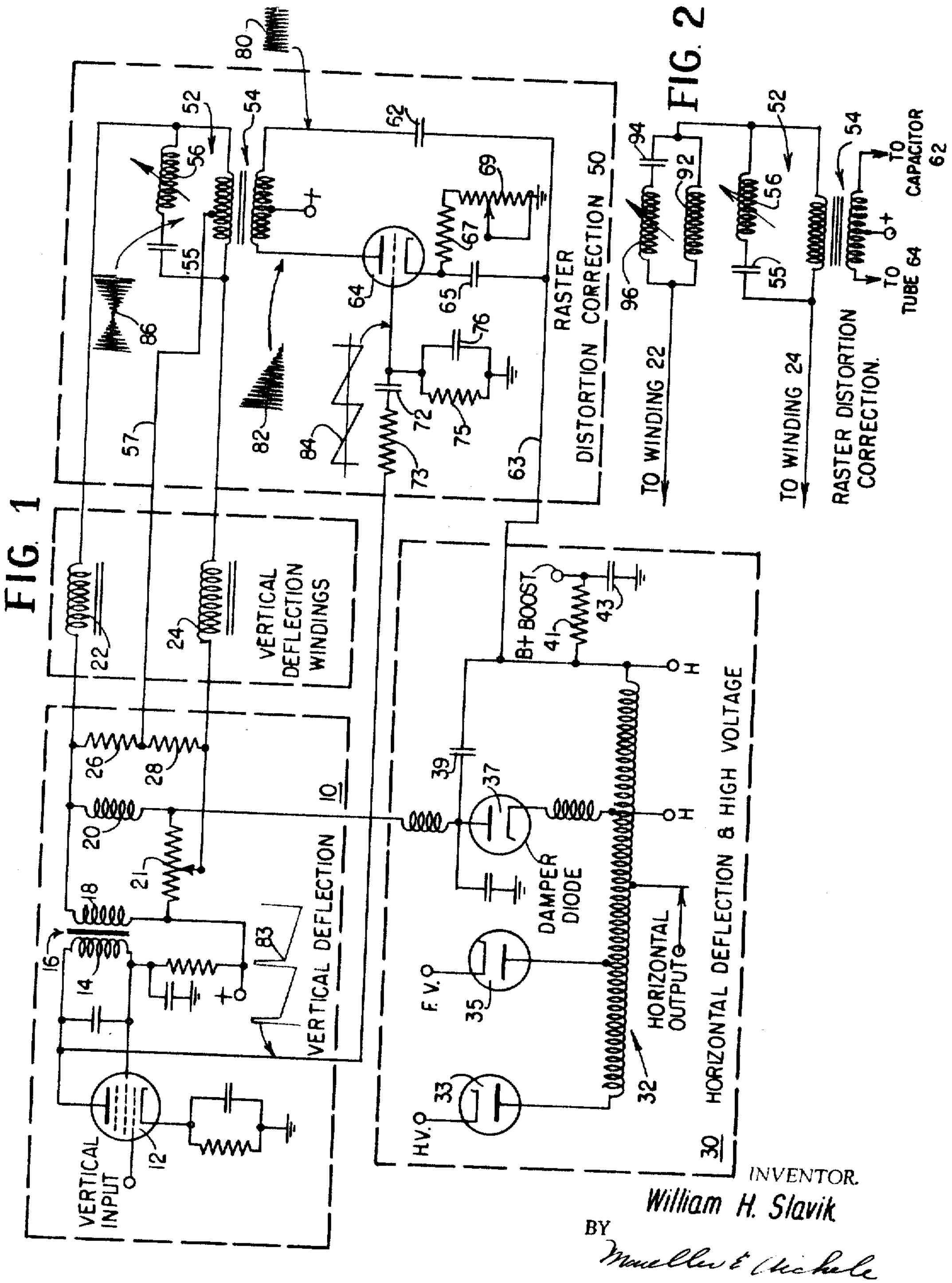
FIG. 1 is a circuit diagram illustrating one form of the invention.
FIG. 2 is a circuit diagram of a modification of the invention.

In a specific form of the invention, a parallel resonant circuit is inserted in series with the vertical deflection windings of a cathode ray tube and tuned to horizontal deflection frequency. Pulses derived from the high voltage portion of the horizontal deflection and high voltage system of the receiver are coupled by two circuit paths to excite the tuned circuit to produce sinusoidal oscillations at horizontal deflection frequency and in phase opposition. One circuit path contains passive elements only, while the other circuit path contains an active element, such as a vacuum tube amplifier, to control the amplitude and phase of the oscillations produced in the tuned circuit.

A sawtooth wave derived from the vertical sweep system changes the gain of the tube in a linear manner, with the polarity of the sawtooth wave causing gain to be a maximum at either the top or the bottom of the raster and providing cutoff at the opposite side of the raster. At the point where gain is a maximum, for example at the top of the raster, oscillations excited by the tube in the tuned circuit are of sufficient amplitude to provide the necessary correction. The gain of the tube decreases linearly so that at the center of the raster waves of equal magnitude but opposite phase provide cancellation in the resonant circuit, and there is zero correction. At the bottom of the raster the tube is cut off so that oscillations excited in the resonant circuit by the passive network provides the necessary correction. The required phase reversal takes place between the correcting oscillations at the top and the bottom of the raster so that correction is symmetrical throughout vertical scan.

In FIG. 1 there is shown portions of a color television receiver in which the vertical dynamic pincushion correction circuit arrangement of the invention is used. The vertical deflection system 10 of the receiver includes an output stage having tube 12 for supplying sawtooth vertical sweep waves to primary winding 14 of vertical output transformer 16. Vertical output tube 12, for example, may be one-half of a plate coupled multivibrator for generating sawtooth waves at the desired vertical scan rate. Circuits of this type are known in the art and in detail form no part of the invention. Secondary windings 18 and 20 of vertical output transformer 16 each have one end connected to vertical deflection winding 22. The other end of each of secondary windings 18 and 20 is connected to an end of centering control potentiometer 21. The center arm of potentiometer 21 is connected to the second vertical deflection winding 24. It is to be understood that vertical deflection windings 22 and 24 form part of the deflection yoke located on the neck of the cathode ray tube of the receiver. A sawtooth wave coupled to deflection windings 22 and 24 from vertical output tube 12 by transformer 16 provides vertical scan of the cathode ray tube of the receiver.

One end of centering control potentiometer 21 is connected to a source of B+ in the receiver. The other end of potentiometer 21 is connected to the anode of the damper diode of horizontal deflection and high voltage system 30. Current to the damper diode results in a voltage drop across potentiometer 21 so that moving its center arm on either side of center will cause a D.C. current to flow through deflection windings 22 and 24 to move the position of the raster in a vertical direction. Secondary windings 18 and 20 are balanced and connected to potentiometer 21 in the same phase so that no A.C. voltage is developed thereacross, and sweep height will remain constant as centering control potentiometer 21 is adjusted.

Resistors 26 and 28, of equal value, are connected between one end of each of vertical deflection windings 22 and 24 to prevent ringing during vertical retrace. The junction between resistors 26 and 28 provides a balance point for sinusoidal oscillations of horizontal sweep frequency which are introduced into vertical deflection windings 22 and 24 in a manner to be subsequently described. These oscillations flow through resistors 26 and 28 rather than the high impedance presented by windings 18 and 20 at horizontal deflection frequency.

The horizontal deflection and high voltage system 30 of the receiver is of a known type and in circuit detail form no part of the invention. Briefly, signals derived from the horizontal output stage (not shown) excite auto transformer 32 which, as illustrated, is tapped to provide line frequency scanning signals at terminals H—H. The high voltage and focusing voltage for the cathode ray tube are developed by rectifiers 33 and 35, respectively. Damper diode 37 has its cathode connected to a further tap on auto transformer 32, and B+ voltage is supplied to its anode through vertical centering potentiometer 21. Bootstrap capacitor 39 is connected between the bottom end of auto transformer 32 and the anode of damper diode 37 to provide a B+ boost potential at the junction of decoupling resistor 41 and filter capacitor 43. Unfiltered B+ boost potential, including parabolic pulses occurring at horizontal deflection frequency, appears at the lower end of auto transformer 32.

The raster distortion correction circuit arrangement 50 includes a parallel resonant circuit 52 connected in series with vertical deflection windings 22 and 24. Resonant circuit 52 includes capacitor 55 and variable inductor 56 connected across the secondary winding of transformer 54 and tuned therewith for parallel resonance at horizontal deflection frequency. Variable inductor 56 provides fine tuning. Alternately a variable capacitor may be used for capacitor 55. The center tap of the secondary winding of transformer 54 is connected by lead 57 to the balance point provided by the common junction of resistors 26 and 28. Sinusoidal oscillations developed in resonant circuit 52 flow through vertical deflection windings 22, 24 and resistors 26, 28 and are returned to the center tap of the secondary of transformer 54 on lead 57. Vertical deflection waves supplied to windings 22 and 24 are also returned from the center tap of the secondary of transformer 52 to the junction of resistors 26 and 28 by lead 57.

One side of the primary winding of transformer 54 is coupled by capacitor 62 and lead 63 to the bottom end of auto transformer 32. As mentioned, parabolic pulses at horizontal deflection frequency appear at this point. The other side of the primary winding of transformer 54 is connected to the anode of electron tube 64, and the cathode of electron tube 64 is coupled by capacitor 65 and lead 63 to the bottom end of auto transformer 32. The cathode of tube 64 is also returned to ground reference potential by resistor 67 and variable resistor 69. The control grid of tube 64 is coupled by the series combination of capacitor 72 and resistor 73 to the anode of vertical output tube 12 and returned to ground reference potential by the parallel combination of resistor 75 and capacitor 76. Resistors 73 and 75 and capacitors 72 and 76 form an integrating network for the vertical deflection wave appearing at the anode of tube 12.

In operation, the parabolic pulses at horizontal deflection frequency developed at the bottom end of auto transformer 32 and appearing on lead 63 are coupled by the passive network including capacitor 62 to one side of the primary of transformer 54 and by an active network including tube 64 and capacitor 65 to the other side of the primary winding of transformer 54. The tuned secondary of transformer 54 is reflected to its primary, and sinusoidal oscillations will be excited in its primary winding in response to the pulses derived from high voltage auto transformer 32. And since both ends of the primary winding of transformer 54 are excited at the same time, oscillations in phase opposition are excited therein. Thus oscillations 80, of constant amplitude, and oscillations 82 of linearly varying amplitude, are developed in opposite ends of the primary winding of transformer 54 in phase opposition. It is to be understood that in practice these oscillations are not independent of one another, as illustrated, but are combined to form the resulting wave 86, shown as reflected to the tuned secondary of transformer 54.

Resistors 73 and 75 and capacitors 72 and 76 integrate the vertical deflection wave 83, including its trace portion and retrace portion, appearing at the output of tube 12 to provide sawtooth wave 84 at the control grid of tube 64. Sawtooth wave 84 produces a linear variation in the gain of tube 64 and hence the amplitude of oscillations 84 during vertical scan. In the embodiment of FIG. 1, sawtooth wave 84 is phased to decrease the output of tube 64 during vertical scan.

The gain of tube 64 is adjusted so that at the top of the raster the amplitude of oscillations 82 is twice that of oscillations 80, with tube 64 cut off by the biasing action of resistor 75 and capacitor 76 at the bottom of the raster. Because of the phase opposition of oscillations 80 and 82 in the primary of transformer 54, oscillations 80 are cancelled at the top of the raster. As the gain of tube 64 decreases with vertical scan, the amplitude of oscillations 80 and 82 become equal so that at the center of the raster they are equal in magnitude. As the amplitude of oscillations 82 continue to decrease and tube 64 is cut off at the bottom of the raster, only oscillations 80 are provided in the primary of transformer 54.

The resulting wave 86 developed in the resonant circuit 52 of the secondary winding of transformer 54 contains sinusoidal oscillations of horizontal deflection frequency that are supplied to vertical deflection windings 22 and 24. This correcting wave, when added to the conventional sawtooth wave coupled to vertical deflection windings 22 and 24 by vertical output transformer 16, produces the desired correction for pincushion distortion appearing at the top and bottom of the raster. It will be noted that the correcting oscillations of wave 86 are a maximum at the beginning and at the end of vertical scan, and zero at the center of scan. In addition, the required phase reversal takes place so that symmetrical correction is provided at both the top and the bottom of the raster.

In a practically constructed circuit the following component values may be used:

| | | |
|---|---|---|
| Capacitor **55** | mf | .022 |
| Inductor **56** | mh | 0.40–2.5 |
| Capacitors **62, 65** | mf | .0015 |
| Tube **64** | | ½6BM8 |
| Resistor **67** | ohms | 330 |
| Resistor **69** | do | 1,000 |
| Capacitor **72** | mf | .1 |
| Resistor **73** | ohms | 470,000 |
| Resistor **75** | do | 100,000 |
| Capacitor **76** | mf | .022 |

Transformer 54 may consist of 228 turns of No. 24 wire secondary in 1482 turns of No. 36 wire primary, wound on a .370" diameter ferromagnetic rod. This provides high inductance with the minimum of turns without saturation arising from vertical deflection current which flows through the secondary of the transformer.

As noted, variable inductor 56 provides an adjustment for tuning the secondary of transformer 54 to horizontal deflection frequency. Variable resistor 69 in the cathode return of tube 64 controls its cutoff and the phase of the wave coupled to one side of the primary winding of transformer 54 from horizontal deflection and high voltage system 30.

Although for ideal correction a parabolic wave of horizontal deflection frequency should be superimposed on the vertical deflection wave, the approximation provided by the above described sinusoidal oscillations produces excellent results for the amount of pincushion distortion present in present day cathode ray tubes. For example, the described circuit will correct a 50 inch pincushion radius to provide substantially flat top and bottom edges of the raster of 90° deflection angle, 23 inch (nominal) cathode ray tube.

In instances where a closer approximation of ideal correction is desired a second parallel resonant circuit, tuned to the second harmonic of the horizontal deflection frequency, may be added as shown in FIG. 2. The parallel resonant circuit including inductors 92 and 96 and capacitor 94 is connected in series between one side of resonant circuit 52 and one of vertical deflection windings 22 and 24. Inductor 92 and capacitor 94 provide a parallel resonant circuit for the second harmonic of the horizontal deflection frequency, with fine tuning provided by inductor 96. Resonant circuit 52 and the manner it is energized by transformer 54 remains as described in conjunction with FIG. 1. This arrangement adds second harmonic components to the correction wave superimposed on the vertical deflection wave for a closer approximation of the ideal parabolic wave.

Although the invention has been set forth with particularity, it should be appearant to those skilled in the art that certain modifications thereof are possible without departing from the spirit and scope of the appended claims. For example, sawtooth wave 84 may be derived from the vertical deflection system 10 to provide cutoff of tube 64 at the top of the raster. And other pulses than a parabolic wave, occurring at horizontal deflection frequency, may be derived from horizontal deflection and high voltage system 30 to excite opposite ends of the primary winding of transformer 54 to produce oscillations in phase opposition therein through capacitor 62 and tube 64.

The invention provides, therefore, an improved circuit for correcting pincushion distortion appearing on the top and the bottom of the raster of the cathode ray tube. It is simple in construction and reliable in operation, producing the desired correction with the minimum of input power. The circuit is particularly useful in color television receivers where it is desirable to provide linear field deflection yokes in conjunction with trigun cathode ray tubes.

What is claimed is:

1. A system for dynamically correcting the raster of a cathode ray tube in a television receiver, including in combination, vertical deflection windings for deflecting an electron beam of the cathode ray tube, a vertical deflection system for energizing said vertical deflection windings with a deflection wave at vertical deflection frequency, a horizontal deflection system for the cathode ray tube including means for generating a pulsating wave at the horizontal deflection frequency, a transformer having primary and secondary windings, means coupling said secondary winding in series with said vertical deflection windings and including capacitor means coupled to said secondary winding to form a resonant circuit operative at the horizontal deflection frequency, a passive coupling circuit connected between said primary winding and said horizontal deflection system for coupling the pulsating wave to said transformer with a given phase, an active coupling circuit connected between said primary winding and said horizontal deflection system for coupling the pulsating wave to said transformer with a phase opposite to said given phase, said active coupling circuit including an electron amplifier device, circuit means coupled between said vertical deflection system and said electron amplifier device for controlling the conduction thereof to produce a varying amplitude of the pulsating wave throughout the vertical deflection period, said pulsating waves from said passive and active coupling circuits combining in said primary winding to cause oscillations in said secondary winding at the horizontal deflection frequency and of one phase and declining amplitude during a portion of the vertical deflection period and of opposite phase and increasing amplitude during another portion of the vertical deflection period.

2. The combination of claim 1 in which said vertical deflection system provides a sawtooth wave at vertical deflection frequency and of decreasing amplitude throughout the vertical deflection period to be coupled through said circuit means to said electron amplifier device, said horizontal deflection system provides pulsating waves of substantially parabolic form, and said passive coupling circuit is a capacitor.

3. The combination of claim 2 in which said active coupling circuit includes variable signal amplitude control means for said electron amplifier device.

4. The combination of claim 1 in which said resonant circuit is parallel tuned to be operative at the horizontal deflection frequency and in which a second resonant circuit is parallel tuned to be operative at the second harmonic of the horizontal deflection frequency and is coupled in series with the series combination of said secondary winding and said vertical deflection windings.

5. A system for dynamically correcting the raster of a cathode ray tube in a television receiver, including in combination, vertical deflection windings for deflecting an electron beam of the cathode ray tube, a vertical deflection system for energizing said vertical deflection windings with a deflection wave at vertical deflection frequency, a horizontal deflection system for the cathode ray tube including a source of unfiltered boost potential providing substantially parabolic waves at the horizontal deflection frequency, a transformer having primary and secondary windings, means coupling said secondary winding in series with said vertical deflection windings and including capacitor means coupled across said secondary winding to form a parallel resonant circuit operative at the horizontal deflection frequency, a first coupling circuit connected between said primary winding and said source of boost potential for coupling the parabolic waves to said secondary winding with a given phase, a second coupling circuit connected between said primary winding and said source of boost potential for coupling the parabolic waves to said secondary winding with a phase opposite to said given phase, said second coupling circuit including an electron amplifier device, circuit means coupled between said vertical deflection system and said electron amplifier device for controlling the conduction thereof to produce a varying amplitude of the parabolic waves throughout the vertical deflection period, said parabolic waves from said first and second coupling circuits combining in said primary winding to cause oscillation in said secondary winding at the horizontal deflection frequency and of one phase and declining amplitude during a portion of the vertical deflection period and of opposite phase and increasing amplitude during another portion of the vertical deflection period.

6. The combination of claim 5 in which said circuit means includes wave shaping elements for applying a sawtooth wave of vertical deflection frequency to said electron amplifier device.

7. The combination of claim 6 which includes variable signal amplitude control means coupled to said electron amplifier device.

8. The combination of claim 5 in which said parallel resonant circuit is adjustable for phasing of the oscillations therein.

9. The combination of claim 5 including a further parallel potential resonant circuit is coupled in series with said secondary winding and said vertical deflection windings and is tuned to be operative at the second harmonic of said horizontal deflection frequency.

10. A system for dynamically correcting the raster of a cathode ray tube in a television receiver, including in combination; vertical deflection windings for deflecting an electron beam of the cathode ray tube, a vertical deflection system for energizing said vertical deflection windings with a deflection wave at vertical deflection frequency, a horizontal deflection system for the cathode ray tube providing a pulsating wave at the horizontal deflection frequency, resonant circuit means tuned to the horizontal deflection frequency and connected in circuit with said vertical deflection windings, a first coupling circuit connected between said resonant circuit means and said horizontal deflection system for coupling the pulsating wave to said resonant circuit means with a given phase, a second coupling circuit connected between said resonant circuit means and said horizontal deflection system for coupling the pulsating waves to said resonant circuit means with a phase opposite to said given phase, said second coupling circuit including an electron amplifier device, circuit means coupled between said vertical deflection system and said electron amplifier device for controlling the conduction thereof to produce a varying amplitude of the pulsating wave throughout the vertical deflection period, said resonant circuit means combining the pulsating waves from said first and second coupling circuits to produce oscillations in said resonant circuit means at the horizontal deflection frequency and of one phase and declining amplitude during a portion of the vertical deflection period and of opposite phase and increasing amplitude during another portion of the vertical deflection period.

11. The combination of claim 10 wherein said resonant circuit means includes a transformer having primary and secondary windings, means coupling said secondary winding in series with said vertical deflection windings, said resonant circuit means further including capacitor means connected in circuit with one of said windings and having a value selected to resonate therewith at said horizontal deflection frequency, said first and second coupling circuits being connected to said primary windings.

12. The combination of claim 11, said capacitor means being coupled across said secondary winding to form a parallel resonant circuit.

No references cited.

DAVID G. REDINBAUGH, *Primary Examiner.*

T. A. GALLAHER, *Assistant Examiner.*